United States Patent [19]
Denton

[11] Patent Number: 5,323,863
[45] Date of Patent: Jun. 28, 1994

[54] O-RING SEAL FOR ROCK BIT BEARINGS
[75] Inventor: Robert Denton, Friendswood, Tex.
[73] Assignee: Smith International, Inc., Houston, Tex.
[21] Appl. No.: 884,657
[22] Filed: May 15, 1992

Related U.S. Application Data
[63] Continuation-in-part of Ser. No. 550,965, Jul. 11, 1990, abandoned.

[51] Int. Cl.$^5$ .............................................. E21B 10/22
[52] U.S. Cl. ..................................... 175/57; 175/371; 277/227
[58] Field of Search ................. 175/371, 372, 228, 57; 277/227, 228; 525/199, 208

[56] References Cited
U.S. PATENT DOCUMENTS 3,788,654  1/1974  Mandley ........................ 277/228 X
3,917,028  11/1975  Garner .............................. 175/228 X
4,614,779  9/1986  Watanabe et al. .................. 525/199
4,675,362  6/1987  Miyabashi et al. .................. 525/208
4,753,304  6/1988  Kelly, Jr. ............................ 175/371
4,851,068  7/1989  Uyehara .............................. 156/371

Primary Examiner—Hoang C. Dang
Attorney, Agent, or Firm—Christie, Parker & Hale

[57] ABSTRACT

A dynamic O-ring seal for retaining the lubrication around a rock bit bearing for drilling subterranean formations has a composition comprising 100 parts by weight highly-saturated nitrile elastomer, furnace black in the range of from 40 to 70 parts by weight, peroxide curing agent in the range of from 7 to 10 parts by weight, graphite in the range of from 10 to 20 parts by weight, zinc oxide or magnesium oxide in the range of from 4 to 7 parts by weight, stearic acid in the range of from 0.5 to 2 parts by weight, and sufficient plasticizer to provide a Shore hardness no more than A 80.

11 Claims, 1 Drawing Sheet

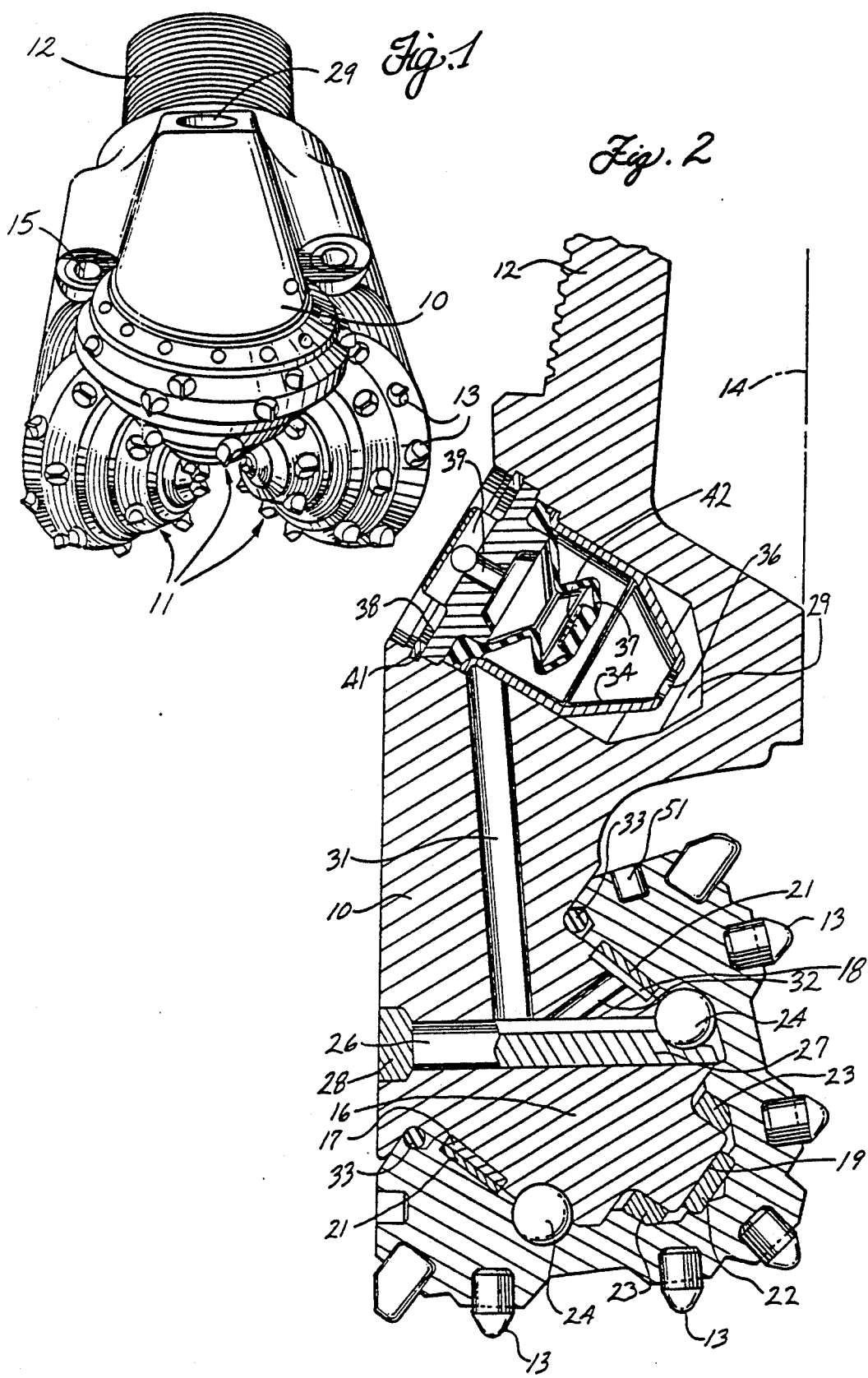

O-RING SEAL FOR ROCK BIT BEARINGS

This application is a continuation-in-part of U.S. patent application Ser. No. 07/550,965, filed Jul. 11, 1990, abandoned now. The subject matter of the prior application is hereby incorporated by reference.

BACKGROUND

This invention relates to an O-ring seal for retaining the lubricant around the journal bearings in a rock bit or drill bit for drilling oil wells or the like.

Heavy-duty drill bits or rock bits are employed for drilling wells in subterranean formations for oil, gas, geothermal steam, and the like. Such drill bits have a body connected to a drill string and a plurality, typically three, of hollow cutter cones mounted on the body for drilling rock formations. The cutter cones are mounted on steel journals or pins integral with the bit body at its lower end. In use, the drill string and bit body are rotated in the bore hole, and each cone is caused to rotate on its respective journal as the cone contacts the bottom of the bore hole being drilled. As such a rock bit is used for drilling in hard, tough formations, high pressures and temperatures are encountered. The total useful life of a drill bit in such severe environments is in the order of 20 to 200 hours for bits in sizes of about 6-½ to 12-¼ inch diameter at depths of about 5000 to 20,000 feet. Useful lifetimes of about 65 to 150 hours are typical.

When a drill bit wears out or fails as a bore hole is being drilled, it is necessary to withdraw the drill string for replacing the bit. The amount of time required to make a round trip for replacing a bit is essentially lost from drilling operations. This time can become a significant portion of the total time for completing a well, particularly as the well depths become great. It is therefore quite desirable to maximize the lifetime of a drill bit in a rock formation. Prolonging the time of drilling minimizes the lost time in "round tripping" the drill string for replacing bits.

Replacement of a drill bit can be required for a number of reasons, including wearing out or breakage of the structure contacting the rock formation. One reason for replacing the rock bits includes failure or severe wear of the journal bearings on which the cutter cones are mounted. These bearings are subject to high pressure drilling loads, high hydrostatic pressures in the hole being drilled, and high temperatures due to drilling, as well as elevated temperatures in the formation being drilled. Considerable development work has been conducted over the years to produce bearing structures and to employ materials that minimize wear and failure of such bearings.

The journal bearings are lubricated with grease adapted to such severe conditions. Such lubricants are a critical element in the life of a rock bit. A successful grease should have a useful life longer than other elements of the bit so that premature failures of bearings do not unduly limit drilling. Failure of lubrication can be detected by generation of elevated pressure in the bit, evidence of which can often be found upon examination of a used bit. The high pressure is generated due to decomposition of oil in the grease, with consequent generation of gas when lubrication is deficient and a bearing overheats due to friction. Lubrication failure can be attributed to misfit of bearings or O-ring seal failure, as well as problems with a grease.

Pressure and temperature conditions in a drill bit can vary with the time as the drill bit is used. For example, when a "joint" of pipe is added to the drill string, weight on the bit can be relieved and slight flexing can occur. Such variations can result in "pumping" of the grease through O-ring seals, leading to loss of grease or introduction of foreign materials, such as drilling mud, that can damage bearing surfaces.

One of the consistent problems in drill bits is the inconsistency of lifetime. Sometimes bits last for long periods, whereas bits which are apparently identical operated under similar conditions may fail with a short lifetime. One cause of erratic lifetime is failure of the bearings. Bearing failure can often be traced to failure of the seal that retains lubricant in the bearing. Lubricant may be lost if the seal fails, or abrasive particles of rock may work their way into the bearing surfaces, causing excessive wear.

Rock bit O-rings are being called on to perform service in environments which are extremely harsh. Modern bits are being run at exceptionally high surface speeds, sometimes more than 500 feet per minute. One face of the O-ring is exposed to abrasive drilling mud. The life of the O-ring may be significantly degraded by high temperatures due to friction (as well as elevated temperature in the well bore) and abrasion.

It is therefore desirable to provide a consistently reliable O-ring seal for maintaining the lubricant within rock bits, that has a long useful life, is resistant to crude gasoline and other chemical compositions found within oil wells, has high heat resistance, is highly resistant to abrasion, has a low coefficient of friction against the adjacent seal surfaces to minimize heating, and that will not readily deform under load and allow leakage of the grease from within the bit or drilling mud into the bit.

BRIEF SUMMARY OF THE INVENTION

There is provided, in practice of the present invention according to a preferred embodiment, a rock bit used for drilling subterranean formations with an O-ring seal for retaining the lubricant around the rock bit bearings, comprising 100 parts by weight of highly-saturated nitrile elastomer, furnace black in the range of from 40 to 70 parts by weight, graphite in the range of from 10 to 20 parts by weight, peroxide curing agent in the range of from 7 to 10 parts by weight, zinc oxide or magnesium oxide in the range of from 4 to 7 parts by weight, stearic acid in the range of from 0.5 to 2 parts by weight, and sufficient plasticizer to provide a Shore hardness no more than A 80.

BRIEF DESCRIPTION OF THE DRAWING

A rock bit containing such an O-ring seal is illustrated in semi-schematic perspective in FIG. 1 and in a partial cross-section in FIG. 2.

DETAILED DESCRIPTION

A rock bit employing an O-ring seal comprises a body 10 having three cutter cones 11 mounted on its lower end. A threaded pin 12 is at the upper end of the body for assembly of the rock bit onto a drill string for drilling oil wells or the like. A plurality of tungsten carbide inserts 13 are pressed into holes in the surfaces of the cutter cones for bearing on the rock formation being drilled. Nozzles 15 in the bit body introduce drilling mud into the space around the cutter cones for cooling and carrying away formation chips drilled by the bit.

FIG. 2 is a fragmentary, longitudinal cross-section of the rock bit, extending radially from the rotational axis 14 of the rock bit through one of the three legs on which the cutter cones 11 are mounted. Each leg includes a journal pin 16 extending downwardly and radially inwardly on the rock bit body. The journal pin includes a cylindrical bearing surface having a hard metal insert 17 on a lower portion of the journal pin. The hard metal insert is typically a cobalt or iron-base alloy welded in place in a groove on the journal leg and having a substantially greater hardness than the steel forming the journal pin and rock bit body.

An open groove 18 is provided on the upper portion of the journal pin. Such a groove may, for example, extend around 60% or so of the circumference of the journal pin, and the hard metal 17 can extend around the remaining 40% or so.

The journal pin also has a cylindrical nose 19 at its lower end.

Each cutter cone 11 is in the form of a hollow, generally-conical steel body having cemented tungsten carbide inserts 13 pressed into holes on the external surface. For long life, the inserts may be tipped with a polycrystalline diamond layer. Such tungsten carbide inserts provide the drilling action by engaging a subterranean rock formation as the rock bit is rotated. Some types of bits have hard-faced steel teeth milled on the outside of the cone instead of carbide inserts.

The cavity in the cone contains a cylindrical bearing surface including an aluminum bronze insert 21 deposited in a groove in the steel of the cone or as a floating insert in a groove in the cone. The aluminum bronze insert 21 in the cone engages the hard metal insert 17 on the leg and provides the main bearing surface for the cone on the bit body. A nose button 22 is between the end of the cavity in the cone and the nose 19 and carries the principal thrust loads of the cone on the journal pin. A bushing 23 surrounds the nose and provides additional bearing surface between the cone and journal pin.

Other types of bits, particularly for higher rotational speed applications, have roller bearings instead of the exemplary journal bearings illustrated herein.

A plurality of bearing balls 24 are fitted into complementary ball races in the cone and on the journal pin. These balls are inserted through a ball passage 26, which extends through the journal pin between the bearing races and the exterior of the rock bit. A cone is first fitted on the journal pin, and then the bearing balls 24 are inserted through the ball passage. The balls carry any thrust loads tending to remove the cone from the journal pin and thereby retain the cone on the journal pin. The balls are retained in the races by a ball retainer 27 inserted through the ball passage 26 after the balls are in place. A plug 28 is then welded into the end of the ball passage to keep the ball retainer in place.

The bearing surfaces between the journal pin and cone are lubricated by a grease. Preferably, the interior of the rock bit is evacuated, and grease is introduced through a fill passage (not shown). The grease thus fills the regions adjacent the bearing surfaces plus various passages and a grease reservoir, and air is essentially excluded from the interior of the rock bit. The grease reservoir comprises a cavity 29 in the rock bit body, which is connected to the ball passage 26 by a lubricant passage 31. Grease also fills the portion of the ball passage adjacent the ball retainer, the open groove 18 on the upper side of the journal pin, and a diagonally extending passage 32 therebetween. Grease is retained in the bearing structure by a resilient seal in the form of an O-ring 33 between the cone and journal pin. Preferably, the O-ring is in a slightly V-shaped groove.

A pressure compensation subassembly is included in the grease reservoir 29. This subassembly comprises a metal cup 34 with an opening 36 at its inner end. A flexible rubber bellows 37 extends into the cup from its outer end. The bellows is held in place by a cap 38 with a vent passage 39. The pressure compensation subassembly is held in the grease reservoir by a snap ring 41.

When the rock bit is filled with grease, the bearings, the groove 18 on the journal pin, passages in the journal pin, the lubrication passage 31, and the grease reservoir on the outside of the bellows 37 are filled with grease. If the volume of grease expands due to heating, for example, the bellows 37 is compressed to provide additional volume in the sealed grease system, thereby preventing accumulation of excessive pressures. High pressure in the grease system can damage the O-ring seal 33 and permit drilling mud or the like to enter the bearings. Such material is abrasive and can quickly damage the bearings. Conversely, if the grease volume should contract, the bellows can expand to prevent low pressures in the sealed grease systems, which could cause flow of abrasive and/or corrosive substances past the O-ring seal.

The bellows has a boss 42 at its inner end which can seat against the cap 38 at one end of the displacement of the bellows for sealing the vent passage 39. The end of the bellows can also seat against the cup 34 at the other end of its stroke, thereby sealing the opening 36. If desired, a pressure-relief check valve can also be provided in the grease reservoir for relieving over-pressures in the grease system that could damage the O-ring seal. Even with a pressure compensator, it is believed that occasional differential pressures may exist across the O-ring of up to ±150 psi.

To maintain the desired properties of the O-ring seal at the pressure and temperature conditions that prevail in a rock bit, to inhibit "pumping" of the grease through the O-ring seal, and for a long useful life, it is important that the O-ring seal be resistant to crude gasoline and other chemical compositions found within oil wells, have high heat and abrasion resistance, have low rubbing friction, and not readily deform under the pressure and temperature conditions in a well and allow leakage of the grease from within the bit or drilling mud into the bit.

Therefore, it is desired that the O-ring seal have a low modulus of elasticity at 100% elongation of from 850 to 1150 psi, a minimum tensile strength of 3000 psi, elongation of from 200 to 350%, die C tear strength of at least 250 lb/in, durometer hardness Shore A of from 74 to 80, and a low compression set after 70 hours at 100° C. of less than 18% and preferably less than 16%.

A variety of O-ring seals have been employed in such rock bits. Such O-rings typically comprise acrylonitrile polymers or acrylonitrile/butadiene copolymers. Other components in the polymers are activators or accelerators for the curing, such as stearic acid, and agents that add to heat resistance of the polymer, such as zinc oxide and curing agents. However, typically, these synthetic rubbers exhibit poor heat resistance and become brittle at elevated temperatures after extended periods of time. Additionally, such compounds often exhibit undesirably low tensile strength and high coefficients of friction. Such properties are undesirable for a seal in a rock bit, since the high operating temperatures of the bit result in frequent failure of the seal.

The O-ring seal of the present invention comprises a highly saturated nitrile (HSN) elastomer. The O-ring seal is formulated to include graphite, a peroxide curing agent, furnace black, zinc oxide or magnesium oxide, and may also include antioxidants, accelerators, plasticizers and processing aids.

The HSN elastomer confers on the O-ring seal the properties of elasticity, good chemical resistance, high mechanical strength, and good resistance to abrasion and elevated temperatures. The graphite produces a composition with low coefficient of friction and excellent wear resistance. The other ingredients also contribute to the properties.

HSN elastomers are structurally similar to standard nitriles. However, they are hydrogenated to reduce the number of carbon-carbon double bonds. The hydrogenation process eliminates between 96% and 99.5% of the double bonds in the nitrile. Without hydrogenation, typical nitrile elastomers are about 88% saturated.

The nitrile elastomers are copolymers of acrylonitrile and butadiene. Their properties depend, among other things, on the ratio of the nitrile and diene. A relatively high acrylonitrile proportion is desirable in practice of this invention since increasing acrylonitrile content raises resistance to hydrocarbons, and increases tensile strength and abrasion resistance, all of which are important properties for an O-ring used in a rock bit. Preferably, the molecular proportion of acrylonitrile in the copolymer is more than 35% and more specifically in the range of from 35 to 50%.

As used herein, highly saturated nitrile refers to a nitrile elastomer wherein at least 96% of the double bonds have been eliminated. The removal of the carboncarbon double bonds reduces the reaction of agents such as hydrocarbons, oxygen, hydrogen sulfide or ozone with the elastomer. Attack by such agents can reduce the tensile strength, elongation, and compression set resistance of the elastomer composition. Elimination of most of the double bonds results in an increased resistance to heat and down-hole chemicals, such as hydrocarbons in the bore and in lubricants, hydrogen sulfide and corrosion inhibitors.

Typically, HSN elastomers, when compared to standard nitriles, have improved properties with respect to increased abrasion resistance and heat resistance. HSN elastomers that may be used in the practice of the present invention are those such as Zetpol 2020, which is supplied by Zeon Chemicals, Inc. of Raleigh Meadow, Illinois, and Therban 2207S which is supplied by Mobay Corp., Pittsburgh, Pennsylvania. Typically, compounds such as Zetpol 2020 are 98% to 99% saturated and Therban 2207S is about 96.5% saturated.

The composition preferably includes high abrasion resistance furnace black (HAF) in the range of from 40 to 70 parts by weight. All parts by weight stated herein are parts relative to 100 parts of HSN (often referred to as PHR, parts per hundred rubber). The furnace black not only enhances the abrasion resistance of the composition, it also increases tensile strength. A blend of a variety of furnace blacks may be used if desired, the tendency being to favor smaller particle size materials. Carbon blacks suitable for the O-ring composition include types N110, N231, N234, N330, N550 and N774. Vulcan 6LM available from Cabot Corporation, Boston, Massachusetts is an exemplary type N231 of furnace black useful in the O-ring composition. A suitable N774 type HAF furnace black is available from the J. M. Huber Corporation, New York, New York.

The HSN is cured with a peroxide curing agent instead of sulfur for better heat resistance. For example, a suitable curing agent is Vulcup 40KE which comprises 40%a,a'bis(t-butylperoxyl)diisopropyl benzene on a kaolin clay. Dicumyl (Dicup) is a suitable curing agent. A relatively high amount of curing agent is employed to assure that a highly cured state is achieved for high resistance to compression set. Preferably the amount of peroxide curing agent is in the range of from 7 to 10 parts per hundred parts HSN.

An exemplary curing cycle for an O-ring is 15 minutes at 175° C. in the press followed by a post cure for four hours at 155° C. The O-ring is pressed from a precut ring of uncured composition in a conventional manner. If desired for longer life, one face of the die may be polished smooth, while the other face is slightly roughened. This produces an O-ring with one face rougher than the other. The rougher face is assembled on the grease side of the seal and the smoother face is assembled on the mud side of the seal. The rougher surface helps convey grease with the moving seal. The smoother surface entrains less of the abrasive particles.

Finely divided graphite powder is also present in the preferred composition in the range of from 10 to 20 parts, preferably 15 parts per hundred HSN. The graphite provides a low coefficient of friction against the adjacent steel seal surfaces. The low friction minimizes localized heating of the O-ring and significantly improves lifetime of the O-ring. For example, in a seal wear test an O-ring having graphite survives a routine 96 hour test cycle with little wear, whereas an identical HSN O-ring without graphite may fail in about 80 hours and show a rough, worn surface which would permit intrusion of drilling mud or extrusion of grease. An increase in lifetime of as much as 20% is a significant improvement in a rock bit.

Stearic acid is present in the range of from 0.5 to 2 parts per 100 parts of HSN. Stearic acid is preferably at the low side of this range for enhanced abrasion resistance. Stearic acid is used as an organic accelerator or activator for efficiency of curing of the polymer.

Zinc oxide is present in the range of from 4 to 7 parts per 100 parts HSN, and, when cured with peroxide, results in increased heat resistance. Preferably the zinc oxide is present at 5 parts per hundred. Magnesium oxide may be substituted for part or all of the zinc oxide.

Among other components in the elastomer composition are antioxidants, plasticizers and processing aids. For example, a plasticizer and curing agent such as TP-95 available from Morton-Thiokol, Trenton, New Jersey, may be used. This comprises di(butyoxy-ethoxyethyl) adipate. Dioctyl phthalate and dioctyl sebacate are other examples of many suitable plasticizers which may be used. Plasticizers may be present up to 10 parts per 100 parts HSN.

A number of so-called processing aids may be included in the composition for better flow in the mixing and molding. These are usually fatty acid esters and may be present up to about 2.5 parts per 100 parts HSN. An exemplary processing aid is Struktol WB212. Preferably, processing aids are avoided since they may degrade properties of the final composition.

A broad variety of conventional antioxidants may be used in the composition in conventional proportions. The antioxidants may be used up to about 3 parts per 100 parts HSN without degrading compression set.

Suitable antioxidants include, for example, Vanox AM (a diphenyl amine-acetone reaction product) and Vanox ZMTI (zinc 2-mercaptotolylimidalole) from R. T. Vanderbilt & Co., Norwalk, Connecticut, Naugard 445 (a substituted diphenyl amine) from Uniroyal Chemical, Naugatuck, Connecticut, and Staugard 500 (a mixture of Naugard 445 and ZMTI).

A preferred composition of the O-ring in the rock bit can be summarized as follows:

| Material | Parts by Weight |
| --- | --- |
| HSN | 100 |
| Furnace black | 40 to 70 |
| Peroxide curing agent | 7 to 10 |
| Graphite | 10 to 20 |
| Zinc oxide (or MgO) | 4 to 7 |
| Stearic acid | 0.5 to 2 |
| Plasticizers | 0 to 10 |
| Processing aids | 0 to 2.5 |
| Anti-oxidants | 0 to 3 |

The HSN preferably has at least 35% acrylonitrile groups in the polymer and is at least 96% saturated.

Among the desired properties of the O-ring seal are a low modulus of elasticity and low compression set. The ranges that are considered acceptable for these properties are a modulus of elasticity at 100% elongation of 700 to 1200 psi and a compression set after 70 hours at 100° C. hours of no more than 16%. In addition, it is desirable that the O-ring seal have a minimum tensile of 3000 psi, elongation at failure of from 200 to 350%, and a durometer hardness of Shore A from 74 to 80.

Various features and advantages of the O-ring seal composition are illustrated in the following examples. It is to be understood that these examples merely illustrate the invention and are not intended to limit the scope of the invention which is defined in the claims.

EXAMPLE 1

A composition was made with 100 parts by weight of Therban 2207S highly saturated nitrile elastomer, 40 parts Vulcan 6LM furnace black, 10 parts Vulcup 40KE peroxide curing agent, 5 parts zinc oxide, 0.5 part stearic acid, 1.1 parts Naugard 445 antioxidant, 0.4 parts ZMTI antioxidant, and 4 parts 1,2-polybutadiene accelerator coagent Ricon 153D available from Colorado Chemical, Golden, Colorado. The composition was cured for 15 minutes in the press at 175° C. and post cured for 4 hours at 155° C.

The tensile strength to breakage was 4100 psi. Durometer hardness was Shore A 80. The modulus of elasticity at 100% elongation was 1168 psi. Elongation to breakage was 267%. Compression set after 70 hours at 100° C. was 12.7%.

EXAMPLE 2

A similar composition was made with addition of graphite. This composition had 100 parts by weight of Therban 2207S highly saturated nitrile elastomer, 40 parts Vulcan 6LM furnace black, 10 parts Vulcup 40KE peroxide curing agent, 15 parts graphite, 5 parts zinc oxide, 0.5 part stearic acid, 1.1 parts Naugard 445 antioxidant, 0.4 parts ZMTI antioxidant, 4 parts 1,2-polybutadiene accelerator coagent Ricon 153D, and 5 parts by weight dioctyl sebacate plasticizer to keep the durometer hardness down to A 80. The composition was cured for 15 minutes in the press at 175° C. and post cured for 4 hours at 155° C.

The tensile strength to breakage was 3500 psi. The modulus of elasticity at 100% elongation was 1075 psi. Elongation to breakage was 305%. Compression set after 70 hours at 100° C. was only 8.9%.

Example 3

A prior embodiment for a "standard" O-ring composition for a rock bit had 50 parts of Hycar 1041 and 50 parts of Hycar 1042 nitrile elastomer (not HSN) from B. F. Goodrich Chemical Co., Cleveland, Ohio, 70 parts of type GPF N660 furnace black per 100 parts of the nitrile elastomer, 20 parts type MT N990 furnace black, 50 parts Vulcup 40KE peroxide curing agent, 0.5 parts of sulfur, 5 parts zinc oxide, 0.5 parts stearic acid, 10 parts of dibutyl phthalate, 2 parts of benzothiazyl disulfide, 1.5 parts of tetramethylthiuram disulfide, 1.5 parts of tetraethylthiuram disulfide, 2 parts of Agerite antioxidant (B.F. Goodrich Chemical Co.) and 2 parts of Flexzone 3C antioxidant (Uniroyal Chemical Co.).

Typical durometer hardness of this composition is Shore A 78; tensile strength is 2528 psi; elongation is 246%; and compression set is 8.3% after 70 hours at 100° C. and 21.6% after 22 hours at 150° C.

The properties of compositions provided in practice of this invention are superior to this standard composition for an O-ring for a rock bit. The tensile strength is as much as 80% greater. The new compositions provide greater wear resistance and greater temperature capability as compared with the conventional nitrile seals. These properties make the O-ring seal capable of running at higher speeds and temperatures.

Compositions as set forth in Examples 1 and 2 were tested for wear resistance in a seal test apparatus simulating the conditions encountered by a rock bit while drilling an oil well or the like. The gland and O-ring seal structure in the test apparatus is substantially identical to the structure employed in a standard production 7-7/8" diameter rock bit.

One face of the seal gland is a cylindrical surface and a radial surface like those adjacent the journal bearing on one "leg" of a rock bit of the type illustrated in FIG. 2 of this application. The other part of the seal gland corresponds to the interior of a rock bit cutter cone. In these tests the cone part of the gland was a so-called V-ramp with a 30° cone converging toward the cylindrical surface in each direction from a larger diameter mid-portion. The squeeze of the O-ring increases as differential pressure shifts the O-ring away from the center of the gland.

The pseudo-cone is assembled on the test "leg" of the seal test apparatus in the same way a cutter cone is assembled on a rock bit leg. The O-ring seal under test is present between the pseudo-cone and pseudo-leg to prevent ingress of drilling mud or extrusion of grease past the seal.

The pseudo-cone is bolted to a drive shaft that passes through the center of the pseudo-leg. The drive shaft is supported by thrust and radial bearings bolted to the seal test apparatus and is rotated by a hydraulic motor. The cone bore is machined 0.005 inch off-center relative to the seal to cause an eccentricity of 0.010 inch in rotation of the pseudo-cone. During service of a rock bit there is a large transverse load on the cone which results in an offset of the cone on the journal, continually exercising the seal as the cone rotates. The eccentricity of the pseudo-cone support simulates this exercising of the seal.

The pseudo-cone and seal under test are bolted into a pressure vessel filled with drilling mud, which is pressurized during the test, typically at 1000 psi.

The interior of the seal is in a closed volume representing the grease reservoir of a rock bit. This volume is vacuum filled with conventional grease. The volume of grease in the reservoir is monitored to determine whether leakage is occurring past the seal under test. During the test hydraulic pressure is applied to the grease reservoir to vary the internal grease pressure by up to ±300 psi differential pressure relative to the pressure of the drilling mud.

In the exemplary tests herein, the differential pressure varied ±25 psi for a minute at each pressure for three cycles, then varied ±75 psi for two minutes and repeated that cycle a couple times. A third cycle varied pressure ±25 psi three times for a minute each and then varied pressure ±150 psi for two minutes each. That series of pressure cycles was repeated every half hour. Such variations are not unusual in actual drilling operations, the larger pressure cycles corresponding to times when another joint of drill pipe is added to the drill string.

During the test the mud reservoir is immersed in a circulating water bath having a temperature of 195° F. During the test, the temperature of the pseudo-leg adjacent the seal surface, temperature of the pseudo-cone, volume of grease sealed inside the apparatus by the O-ring, and the pressure required by the hydraulic motor driving the apparatus are continually recorded. Motor pressure represents the torque required to rotate the pseudo-cone. The test is run for 96 hours, unless terminated sooner by seal failure or (occasionally) by a machine anomaly unrelated to the seal.

After a 96 hour wear test at a rotational speed of 200 RPM, an O-ring made of an HSN composition as described in Example 1 showed a weight loss of 4.62% due to wear. 3.2 ml. of drilling mud intruded into the bearing area past the HSN seal. Such drilling mud would damage the bearing surfaces. In a similar test of a graphite containing composition as described in Example 2, the O-ring had a weight loss of only 2.23% and no drilling mud intrusion was noted. The plain HSN O-ring showed moderate wear, whereas the graphite containing HSN O-ring showed only slight wear.

Additional tests were run with the pseudo-cone being rotated at a speed of 400 RPM. The graphite containing O-ring survived the 96 hour test, but the plain HSN O-ring failed at about 80 hours. The HSN seal had a weight loss of 6.3% versus a weight loss of 2.8% for the graphite containing HSN. The test of the HSN O-ring was stopped at about 80 hours when 10 ml of drilling mud intruded past the HSN O-ring. It is part of the test routine to stop the test when 10 ml. of mud has intruded. Mud intrusion past the graphite containing HSN after 96 hours was only 8.0 ml.

No comparable tests were made of an O-ring made of a composition as set forth in Example 3 since it is known that such a standard nitrile O-ring is significantly poorer than the HSN O-ring and would not have survived even close to 80 hours at 400 RPM.

What is claimed is:

1. A rock bit for drilling subterranean formations comprising:
   a bit body including a plurality of journal pins, each having a bearing surface;
   a cutter cone mounted on each journal pin and including a bearing surface;
   a pressure-compensated grease reservoir in communication with such bearing surfaces;
   a grease in the grease reservoir and adjacent the bearing surfaces; and
   a dynamic O-ring seal for retaining the grease in the bearing comprising:
      100 parts by weight of highly-saturated nitrile elastomer;
      furnace black in the range of from 40 to 70 parts by weight;
      peroxide curing agent in the range of from 7 to 10 parts by weight;
      graphite in the range of from 10 to 20 parts by weight;
      zinc oxide or magnesium oxide in the range of from 4 to 7 parts by weight;
      stearic acid in the range of from 0.5 to 2 parts by weight; and
      sufficient plasticizer to provide a Shore hardness no more than A 80.

2. A rock bit as recited in claim 1 wherein the highly-saturated nitrile is at least 96% saturated.

3. A rock bit as recited in claim 2 wherein the highly-saturated nitrile has a least 35% acrylonitrile groups in the polymer.

4. A rock bit as recited in claim 1 wherein the graphite is present at 15 parts by weight.

5. A rock bit as recited in claim 1 wherein the stearic acid is present at 0.5 parts by weight.

6. A method for lubricating a rock bit for drilling subterranean formations, the rock bit including a bit body and a plurality of cutter cones mounted on the bit body with bearings, comprising the steps of:
   evacuating a portion of the rock bit body including the journal bearings;
   introducing grease into the evacuated portion of the rock bit body and journal bearings; and
   retaining the grease with a dynamic O-ring seal comprising:
      100 parts by weight of highly-saturated nitrile elastomer;
      furnace black in the range of from 40 to 70 parts by weight;
      peroxide curing agent in the range of from 7 to 10 parts by weight;
      graphite in the range of from 10 to 20 parts by weight;
      zinc oxide or magnesium oxide in the range of from 4 to 7 parts by weight;
      stearic acid in the range of from 0.5 to 2 parts by weight; and
      sufficient plasticizer to provide a Shore hardness no more than A 80.

7. A method as recited in claim 6 wherein the highly-saturated nitrile is at least 96% saturated.

8. A method as recited in claim 7 wherein the highly-saturated nitrile has at least 35% acrylonitrile groups in the polymer.

9. A method as recited in claim 6 wherein the graphite is present at 15 parts by weight.

10. A rock bit for drilling subterranean formations comprising:
    a bit body including a plurality of journal pins, each having a bearing surface;
    a cutter cone mounted on each journal pin and including a bearing surface;
    a pressure-compensated grease reservoir in communication with such bearing surfaces;

a grease in the grease reservoir and adjacent the bearing surfaces; and a dynamic O-ring seal for retaining the grease in the bearing consisting essentially of:
- 100 parts by weight of highly-saturated nitrile elastomer;
- 40 parts by weight of furnace black;
- 10 parts by weight of peroxide curing agent;
- 15 parts by weight graphite;
- 5 parts by weight zinc oxide or magnesium oxide;
- 0.5 parts by weight stearic acid; and
- sufficient plasticizer to provide a Shore hardness no more than A 80.

11. A rock bit as recited in claim 10 further comprising:
- 1.5 parts by weight antioxidant; and
- 4 parts by weight 1,2-polybutadiene; and wherein the plasticizer comprises 5 parts by weight dioctyl sebacate.

* * * * *